April 2, 1968

O. C. STAMPS ETAL 3,375,976

FERTILIZER APPLICATION PROCESS

Filed April 19, 1967

DAVID W. NEIKIRK
AND OTIS C. STAMPS
INVENTORS

BY
Ely Silverman
ATTORNEY

April 2, 1968     O. C. STAMPS ETAL     3,375,976
FERTILIZER APPLICATION PROCESS Filed April 19, 1967

DAVID W. NEIKIRK
AND OTIS C. STAMPS
INVENTORS

BY
*Aly Silverman*
ATTORNEY

United States Patent Office 3,375,976
Patented Apr. 2, 1968

3,375,976
FERTILIZER APPLICATION PROCESS
Otis C. Stamps and David W. Neikirk, Clovis, N. Mex., assignors to Inject-O-Meter Manufacturing Company, Inc., Clovis, N. Mex., a corporation of New Mexico
Continuation-in-part of application Ser. No. 546,443, Apr. 29, 1966, now Patent No. 3,326,232, dated June 20, 1967. This application Apr. 19, 1967, Ser. No. 632,081
4 Claims. (Cl. 239—10)

ABSTRACT OF THE DISCLOSURE

A process of applying chemical fertilizers by a combination of a high pressure pump system with an irrigation apparatus and effecting application of such fertilizers to farm land at a substantially constant weight of fertilizer per unit area of the land at any of several desired levels of intensity.

---

This is a continuation-in-part of application Ser. No. 546,443, filed Apr. 29, 1966, now Patent No. 3,326,232, issued June 20, 1967.

This invention relates to a process for application of liquid fertilizer to farmland.

Current conventional practice in the application of fertilizers to land prior to this invention has been to separately apply fertilizer to the land by mechanically drawing a distributor therefor over the land behind a tractor. This practice is expensive in view of the time and labor requirements therefor and, also, the handling of such materials is a potentially dangerous as well as an undesirably smelly job. We have observed that while liquid fertilizers and conventional fluid proportioners and irrigating apparatuses are well known, the application of such fluid proportioners to irrigation waters to apply liquid fertilizers through irrigation apparatuses to the land has not been practical. The traveling sprinklers that move continuously stepwise while spraying such as in U.S. Patents 2,726,895; 2,604,359; and 2,893,643, have pressure pulses in the lines that feed water thereto which make control according to pressure undesirable. Other traveling sprinklers as U.S. Patent 3,230,969 do not deliver water while moving but stay in one position for a fixed length of time while delivering water then, prior to moving to the next station and then sprinkling again for a fixed time, dump all the water theretofore in the distributing line at the particular location from which such sprinkling was done prior to moving to the next position. This makes feed of fertilizer proportional to the volume of fluid distributed undesirable.

Further, in all such apparatuses the amount of pressure required in a line to get to a particular operating position station at variable distance from the water source varies when the volume of flow delivered to the apparatus is the same or the volume varies if the pressure is the same. Further still, the pressure in the line varies as the sprinkler spray is directed towards or away from the wind and the volume accordingly varies inversely as the pressure which pressure in turn is subject to the vagaries of the wind. Even in the apparatuses, e.g., U.S. Patent 1,068,-797 (Mathers) which stay at a fixed position in the field and sprinkle water through rotating arms, the pressure in the line and the volume delivered vary periodically and if fertilizer is fed to the land in amounts that are metered proportional to the amount of water only there is a variation in the amount of fertilizer applied to each area of land.

Also, the solid debris usually carried by irrigation waters makes the use of the orifice plates used to measure the liquid passing through irrigation water distribution pipes to irrigating apparatus that distribute the water to the land impractical because such solids build up on both sides of the orifice plates. Such accumulations render such orifice plates substantially unusable for purposes of any accurate flow measurements for control of the volume of liquid fertilizer to be added to such liquid. Further still, the pressure on an irrigation line undergoes spurts or changes caused by vibration and by clogging or freedom from clogging by silt of the filters which are in series with the pumps as well as because of the operation of the presently available irrigating apparatuses used to apply water to the land. Further still, the amount of water applied to each of several sections of land may vary widely during the same period of a few days of irrigating a large farm tract. This is because of the varying amounts of water required by the soils of each of the different sections or portions of the land due to the different condition of the crops thereon and the demand of different crops on different, although adjacent, fields. Further still, the amount of water to be applied to the same land varies at different times, i.e., more may be required during hot late summer day than during the earlier summer and according to the capacity of the well and the soil. Accordingly, a process or apparatus providing chemicals in proportion to the amount of water added to such land will require at least the frequent replacement of orifice plates or venturi tubes because of the very large range in amounts of water applied to any one portion of land or during any one application and such repeated or periodic replacement is impratcical.

Th size of the irrigation pipes and the needed range in flow rates for irrigation waters makes venturi tubes for such application unduly expensive. Accordignly, notwithstanding the availability of irrigating apparatuses and availability of liquid fertilizers and fluid proportioners there is not prior to our invention a method of applying fertilizer to the ground utilizing irrigation apparatus that is practical, even though it is known that adequate fertilization is necessary for competitive crop yield and excess addition of fertilizer to land is not only expensive but also causes a "burning" of the crops subsequently raised on that land and, as in the case of excessive nitrate addition, such excessive addition of fertilizer may cause harm to the consumers of such crops.

Accordingly, one object of this invention is to provide an apparatus to deliver reliably a quantitatively controllable supply of liquid fertilizer to land by an irrigation line and apparatus relatively independent of the normal operational variation in solid content, pressure and volume of flow of water therein.

A further object of this invention is to provide an apparatus whereby to readily change and control the delivery of a predetermined quantity of liquid fertilizer to and through an irrigation system and thereby to farm land.

Yet another object of this invention is to provide an apparatus readily installed and simple to use in the field.

Another object of this invention is to provide a reliable quantitatively controllable process to supply liquid fertilizer to land.

A further object of this invention is to provide a process whereby to readily change and control delivery of a desired quantity of liquid fertilizer to the farmland.

Other objects of this invention will be apparent to those skilled in the art and a study of the description in the below specification and drawings, of which description the drawings form a part and wherein the same number refers to the same part throughout and wherein.

TABLE 4.—CALIBRATION OF FLOWMETER 34

Figure 1:
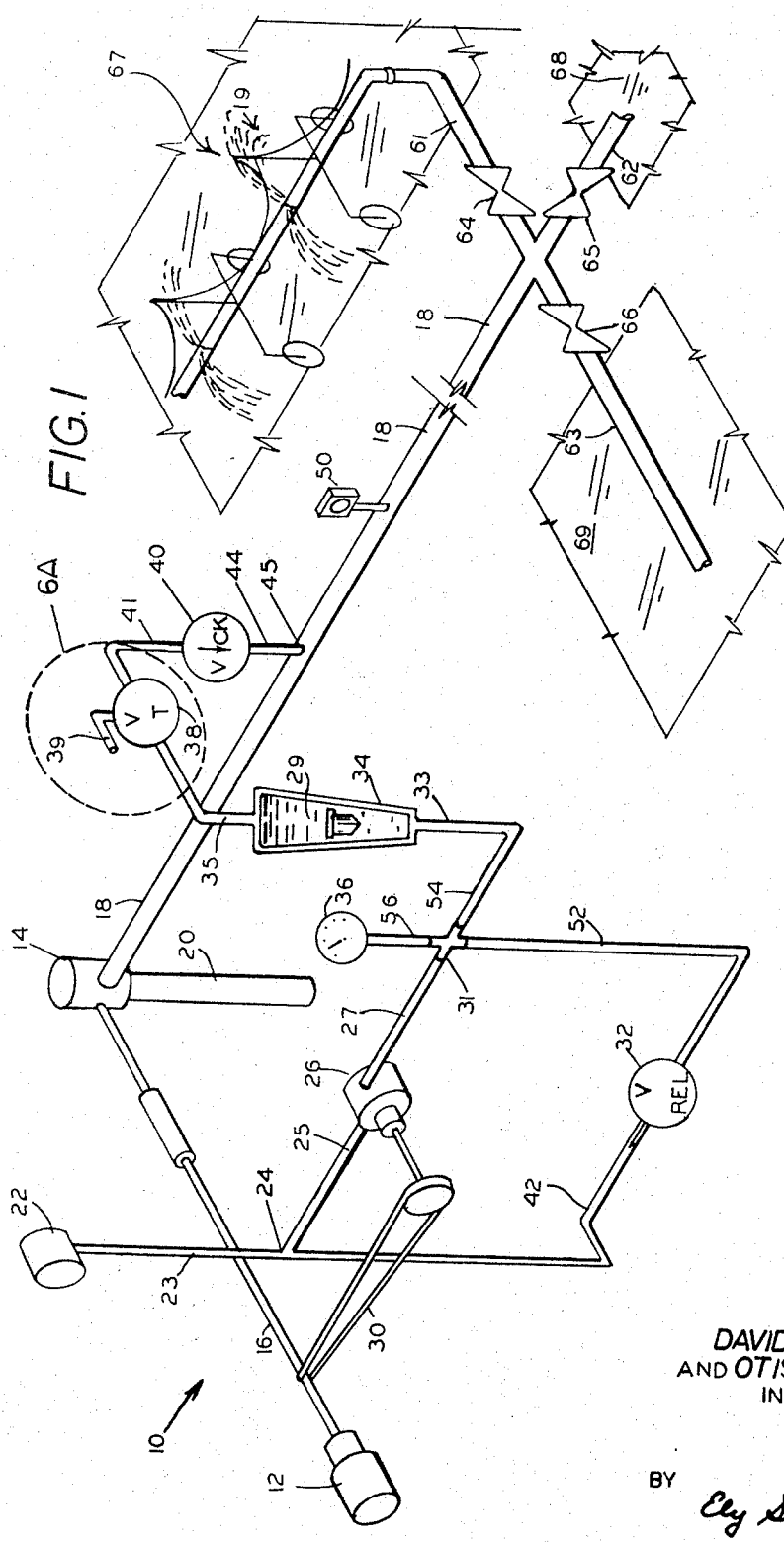
FIGURE 1 is a diagrammatic isometric overall view of a complete apparatus and system according to this invention during its operation.

| Flowmeter reading: | Gallons per minute |
|---|---|
| 5 | 0.0425 |
| 10 | 0.0845 |
| 15 | 0.1550 |
| 20 | 0.2347 |
| 25 | 0.2958 |
| 30 | 0.3568 |
| 35 | 0.4225 |
| 40 | 0.4930 |
| 45 | 0.5493 |
| 50 | 0.6101 |

In one particular preferred embodiment of the invention the overall apparatus, 10, comprises a conventional internal combustion engine 12 which is directly attached to and drives the well pump 14 by a rigid cylindrical shaft 16 therebetween and operatively connected to both. Water is obtained from the well 20 by the action of the pump 14. The pump 14 discharges into a well pump discharge line 18; line 18 is operatively connected to a sprinkler irrigation apparatus 19.

A liquid chemical supply tank 22 is operatively connected by a tank discharge line 23 to one inlet arm of a T 24.

The other inlet arm 42 of the T is operatively connected to the discharge outlet of the pressure relief valve 32. The outlet arm of the T is connected to the inlet line 25 of a gear pump 26. The gear pump 26 discharges such liquid by the pump outlet line 27. The impeller of pump 26 is driven by a pulley wheel 28. Wheel 28 is operatively attached by belt 30 to the shaft 16. The outlet line 27 is directly connected to the inlet arm of a cross 31.

The three outlet arms 52, 54, and 56 of the cross 31 are respectively, operatively connected to the inlet of an adjustable pressure relief valve 32, a flowmeter 34 and a bourdon pressure gauge 36. Arm 54 is operatively connected to the inlet of the flowmeter 34. The outlet of meter 34 is operatively connected to the flowmeter outlet line 35. The outlet line 35 feeds directly into and is operatively connected to a throttle control valve 38. The action of valve 38 is readily controlled by the handle 39 thereof. The control valve outlet is connected by the check valve line 41 to a check valve 40. The check valve 40 discharges through an entry line 44 into a nipple 45 welded to the outside of and open to the interior of the well pump discharge line 18; it (45) does not project into the interior of the line 18 and does not interfere with the flow therethrough.

Line 18 is provided with a tap to record pressure by a pressure recording gauge 50. Line 18 is the main irrigation line and is connected by valved branches 61, 62, and 63, each provided with valves 64, 65, and 66, respectively, for connection to a site on the fields 67, 68, and 69, respectively, to provide for operative connection of a sprinkler apparatus as 19 thereto.

The lines 23, 25, 27, 52, 54 and 44, 56, 41 and 42 are all ⅜ inch internal diameter nylon plastic pipe. The large size of the line and its hydrophobic characteristics prevent caking up of the fertilizer (which may have a low pH) on contact with rather alkaline irrigation waters. There are no valves between the line 44 and the line 18, and the line 44 being transparent, any encrustations therein can be readily corrected by removal and replacement of the line 44. While 38 herein is a common plug valve, 49, the preferred embodiment to be used in the FIG. 1 system, has a vertically elongated hollow cylindrical and perforated valve body 70 and a casing assembly 80 operatively attached to each other. The valve body 70 encloses a coaxial central vertically extending longitudinal chamber 76 open at the bottom of body 70. A plurality of radial passageways 71, 72, 73, 74, and 75 pass separately from the chamber 76 to the outer surface of the valve body 70. These passageways are threaded. Orifices of different sizes 81, 82, 83, 84, and 85 are located in each of passageways 71, 72, 73, 74, and 75, respectively. A gasket assembly 89 is firmly held against the valve body 70 by the casing subassembly 80. Casing assembly 80 comprises rigid matching perforated top and bottom plates 91 and 92, imperforate front and rear plates 93 and 94 and perforate left and imperforate right casing plates 95 and 96. Each of the opposing plates as 93 and 94 are held together by tightenable nuts and bolts; two pairs of nuts and bolts as 97 and 98 for each of the opposing plates. (Each end of each plate has two such nuts and bolts, so that there is a total of four such bolts for each such plate.) The handle 90 has a shaft 100 which is firmly attached to the upper end of valve body 70. The shaft enters the valve body through a hole 101 therefor in the top casing plate 91. The left side casing plate 95 is provided with an orifice which is aligned with the center of the passageways 71, 72, 73, 74, and 75 whereby to provide for passage of the fluid from the line 35 to the orifices and thence from those passageways to the chamber 76. The bottom plate 92 has a perforation 102 therein coaxial with chamber 76 for operative connection of chamber 76 to the line 41 and line 41 is operatively connected therethrough to the chamber 76.

The passageways 71, 72, 73, 74, and 75 are all equal-sized and hollow cylinders of right cylindrical shape. The axes of all of those cylinders are normal to the central longitudinal axis of the cylindrical chamber 76. The shaft 100 also has its center along the central axis of the chamber 76 and the handle 90 has its center coaxial with the center of the shaft 100. The central longitudinal axes of the shafts 71, 72, 73, 74, and 75 all lie in the same flat plane, that one flat plane being perpendicular to the axis of shaft 100 and the chamber 76. The interior of line 35 is substantially cylindrical in shape. At the point where the line 35 joins the valve 38 the central longitudinal axis of the line 35 lies in the same flat plane as do the central longitudinal axes of each of the passageways 71–75. Accordingly, rotation of the handle 100 provides for putting into connection with the line 35 one of the orifices in 71, 72, 73, 74, or 75 or a blank portion whereby an orifice of a desired fixed size may be interposed between the line 54 and 41 and thereby provide fixed sizes of restriction rapidly therebetween without guesswork. Fixed to shaft 100 is a holding plate 104 which is notched and a top plate 91; it serves to hold handle 90 in any of one of six orifice locating and flow controlling positions held by latch 105.

In the preferred embodiment of apparatus shown in the figures the motor 12 and the pump 14 are supported on a rigid steel frame 106 therebetween to facilitate the handling thereof and to fix the relations therebetween. The frame is made of steel L's or channels as 107 and 108 with rigid steel bridging members as 109 therebetween. The elements 25, 26, 27, 28, 31, 32, 33, 34, 35, 36, and 38 are firmly fixed to a panel 110 which is formed of sturdy steel plate. The panel 110 is fixedly attached to and supported on an adjustable vertical leg 112 which is firmly attached by a footing 114 which is firmly fixed in the ground adjacent to the frame 106. The leg 112 is adjustable as to height on footing 114. This permits the removal of the entire panel 110 and all parts associated therewith as needed.

In the presently preferred embodiment characteristics of the apparatus used are given in Table 1. In Table 2 characteristics of the below described operation of such apparatus are given.

TABLE 1

| Item | Ref. No. | Description |
| --- | --- | --- |
| Pump | 26 | Viking-Cast Iron gear pump (FH-78+66195): capacity=1-200 p.s.i.; volume=1-100 g.p.m. to withstand corrosion. |
| Bourdon Pressure Gauge. | 36 | Range 0-200 p.s.i.—withstands corrosive materials. |
| Pressure Relief Valve. | 32 | To withstand corrosion: capacity 5-200 p.s.i. Fisher Governor Co. Bulletin C-98H, orifice size, ½". |
| Flow Meter | 34 | Fisher and Porter Catalog 10A1000-65, Model 10A365A, ½" size. |
| Piping | 23, 25, 27, 35, 41, 42, 52, 54 | ½" I.D. transparent nylon. |
| Pump | 14 | 1,100 g.p.m. capacity. |
| Motor | 12 | 413 in.³ Chrysler. |
| Irrigator | 19 | Valley, U.S.P. 2,604,359. |
| Line | 18 | Diameter, 8"; Length to irrigator, 100'. |
| Valve | 38 | Plug valve (French, Engineering drawing, pp. 244-245, 1941). |

It is the plug valve that is used for data of Table 2 and 3.

In operation when the liquid fertilizer is moving from container 22 to line 18, the liquid fertilizer solution 29 (an 11-33-0 N.P.K. liquid solution used because it can be stored in mild steel equipment) passes from the container 22 which is the tank truck in which that material was transported by the line 23 and the T 24 to the pump 26 on the panel 110. The rotation of the shaft 16 between the motor 12 and the pump 14 and the operative connection of the belt 30 thereto (16) drives the belt 30. The belt 30 drives the pulley wheel 28. The wheel is directly connected to pump 26 and the pump drives the liquid (solution 29) to the cross 31 at a pressure shown on gauge 36. The line 56 operatively connects to the gauge 36 to indicate the pressure at the cross and the liquid 29 passes, when pump 26 is operating; from the T 31 towards the adjustable release valve 32 but not through it unless the pressure in line 52 rises above the pressure value set for the adjustable pressure release valve and towards and to the flowmeter 34. The liquid 29 passes through the meter 34 to the line 35 and thence to the control valve 38. The liquid 29 passes through the valve 38 at a rate dependent upon the pressure in line 35 and the orifice size through valve 38 as set by its handle 39. Liquid 29 then passes through the line 41 to the check valve 40 which is firmly located on top of the line 18. The liquid 29 then passes through the line 44 and the nipple 45 into the line 18. Concurrently with the above operation the pump 14 raises water from well 20 and forces it through the line 18 usually at 50 to 150 p.s.i. pressure past the nipple 45 through pipelines as 61 to the field 67 or through line 62 to the field 68 or through the lines 63 to the field 69. Each of the lines 61, 62, and 63 is provided respectively with a shut-off valve 64, 65, and 66. Thereby the flow of the water from the well 20 is controlled to go to any of the lines 61, 62, or 63 and thence to the apparatus 19. The apparatus 19 used, in the preferred embodiment, is known as a valley sprinkler and described in U.S. Patent 2,604,359 and distributes the liquid from line 61 to the field 67 while the water from well 20 is pumped thereto. Accordingly, by this process the water from the well 20 is supplied with liquid fertilizer from a tank 22 and such water mixed with fertilizer is applied to a field as 67.

After delivery of the required amount of water to a field as 67 the valve as 64 to the irrigation apparatus 19 is closed and the irrigator apparatus 19 is then moved to another position as to connect to line 62. The line 18 is then connected to the irrigator apparatus 19 and sprinkling is again begun. At the time when the valve 64 is closed the pressure in the line 18 rises. The pump 14 should be shut prior to the shutting off of the valve but this is not always done and is not necessary according to this process. On shutting down the valve 64 the check valve 40 closes and the valve 32 is opened whereupon liquid 29 is no longer transferred from the tank 22 to the line 18 until the irrigator is operatively connected to line 18. The check valve 40 is also closed automatically when there is difficulty with the irrigator 19 which raises the pressure in line 18. Generally the greatest and controlling resistance of flow of liquid 29 through the flowmeter 34 is (as illustrated by the data of Table 2 below) provided by the valve 38: the pump 26 has a sufficiently large capacity to overcome line pressure variations except for the largest slugs of pressure as due to closing of valve 64, 65, or 66 and such surges close the check valve 40.

The amount of fluid passing through meter 34 is adjusted to a higher rate of flow by adjustment of the setting of the relief valve 32 to sustain a higher pressure prior to returning the liquid 29 through the return line 42 and concurrently enlarging the orifice through the valve 38 to provide a lesser resistance to flow through the meter 34 while still maintaining the controlling relationship of the pressure drop through the valve 38 to the flow from liquid source 22 to the line 18. This relationship is assured by having a pressure drop of at least 20 p.s.i. from meter 36 to line 18 when the flow of liquid fertilizer is about one gallon per minute. Too low a pressure drop makes the flow through meter 34 too sensitive to pressure changes in line 18: to high a pressure drop renders the operation of the check valve and pressure release valve 32 too insensitive to stoppages in line 18 and applicator 19. Liquid 29 flows from valve 38 through the line 41, valve 40 and line 44 into the line 18. This relationship of apparatus and process provides that the resistance provided by the control valve 38 is a controlling factor to flow and minor variations in pressure, volume, etc. density of the irrigating waters in line 18 and minor variations in pressure in line 18 do not (as shown in Table 2) affect the substantially constant rate of flow of liquid fertilizer from the tank 22 into the line 18 and field as 67 notwithstanding the variations in pressure and volume that occur within the line 18 due to the inherent characteristics of the operation of the pump 14 and the apparatus 19. Further still, this constant flow from the line 22 to the line 18 provides that there are no oscillations added to the flow pattern of the water through the line 18 such as are caused by an irregular stopping and starting of flow into the line 18; rather, there is a steady flow and pressure from the line 44 into the line 18.

As this system takes its driving power from the shaft 16 of the irrigation engine 12, should the irrigation engine shut down for any reason the pumping of fertilizer liquid from the container 22 automatically stops. Accordingly, no chemicals are wasted and no excessive concentration of fertilizer is provided in the portion of water then in the line 18 for subsequent distribution to the field as 67.

Figure 2:
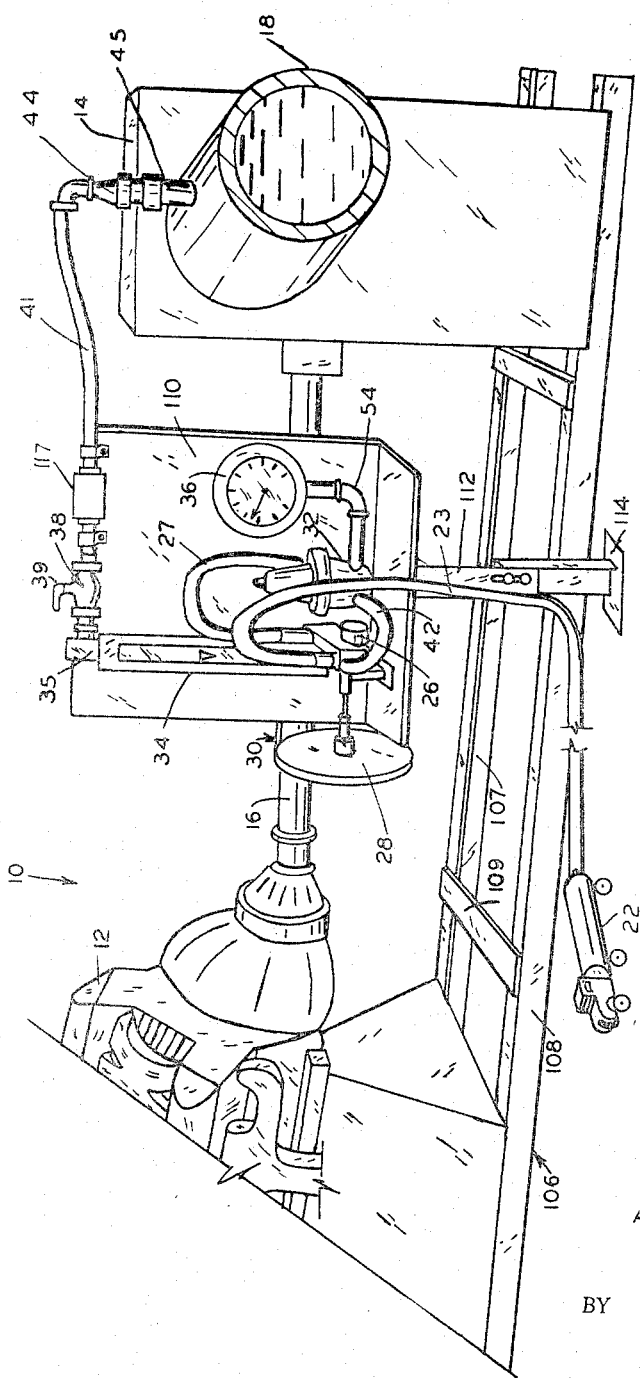
FIGURE 2 is a perspective view of the control portion of the apparatus shown in FIGURE 1.
Figure 3:
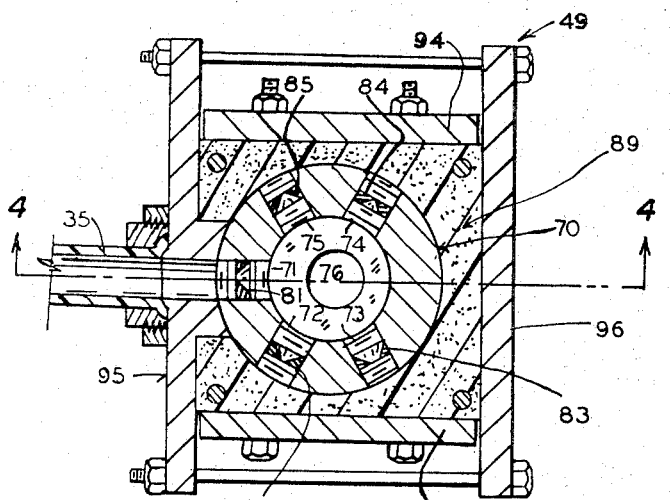
FIGURE 3 is a horizontal transverse sectional view of a preferred embodiment of valve as seen in section 3—3 of FIGURE 4.
Figure 4:
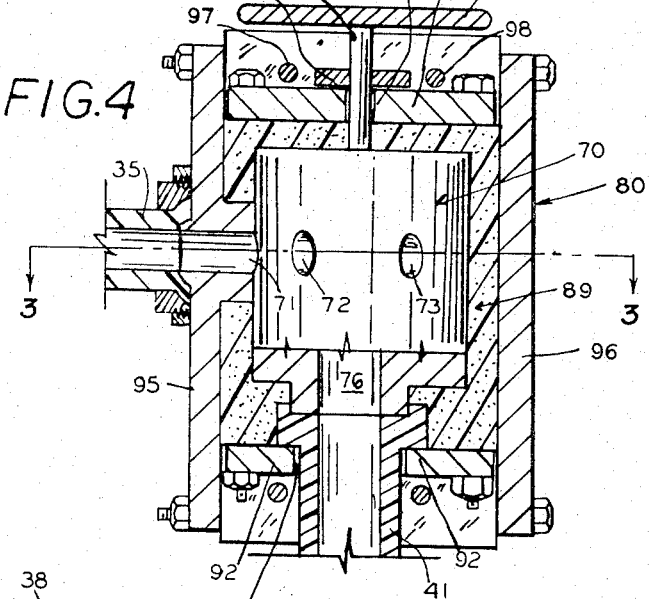
FIGURE 4 is a broken away view, partly in vertical longitudinal section, along plane 4—4 of FIGURE 3 of the control valve shown in FIGURE 3.
Figure 5:
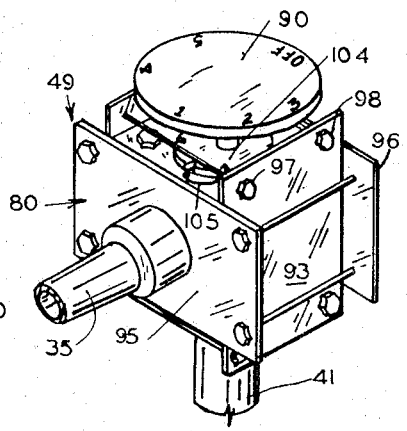
FIGURE 5 is a perspective side view of the valve shown in FIGURE 3.
Figure 6:
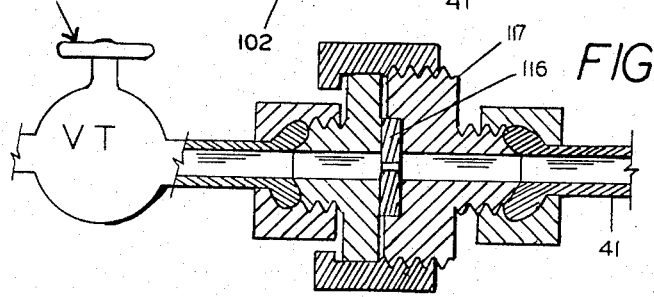
FIGURE 6 is an enlarged view of zone 6A in FIGURE 1 in a modification thereof.

Table 2 illustrates the relationship of the line pressure and pump 26 injection pressure as measured at the meter 36. During operation of apparatus 10 the irrigation line pressure (L.P.) oscillated for a range of about 2 pounds per square inch with oscillations at the frequency of 3 or 4 cycles every 15 minutes with other minor oscillations superimposed thereon; while there was a dip in line 18 pressure at 4:35–4:40 p.m. from 95 to 88 p.s.i. there was an increase in flow reading only from 16 to 17 as a flow rate change. From the time the test began at 10:15 a.m. until 11:15 p.m. on the same date no adjustments were made to any gauge or valves on this injector arrangement. This test shows that, notwithstanding the periodic and repeated 1–2 p.s.i. line pressure changes there was no change in the injector flow rate and even a 7 to 8 p.s.i. line pressure change produced very little change in flow rate of the liquid fertilizer.

sired at the time, while the rate at which the water will flow to the land through the apparatus depends on the capacity of the well to deliver varying amounts of water and the capacity of the land to absorb the water. Accordingly the operation according to this invention provides a given weight of fertilizer per unit area of land independent of other limiting factors. A five-day test of the apparatus of FIGURE 2 is shown in Table 3 to show the readily controlled variability of flow rate provided thereby.

TABLE 2.—OPERATION DATA—1 DAY TEST

| Time | Instrument Readings [1] | | | | |
|---|---|---|---|---|---|
| | O.T. | W.T. | L.P.[2] | I.P. | F.R. |
| 10:15 a.m. | 60 | 68 | 96 | 129 | 17-0/4 |
| 10:45 | 60 | 68 | 96 | 129 | 16-3/4 |
| 11:25 | 63 | 68 | 96 | 129 | 16-1/4 |
| 11:55 | 62 | 68 | 96 | 129 | 16-0/4 |
| 1:25 p.m. | 63 | 68 | 95 | 129 | 16-0/4 |
| 2:10 | 64 | 68 | 95 | 129 | 16-0/4 |
| 2:45 | 63 | 68 | 95 | 129 | 16-0/4 |
| 3:25 | 61 | 68 | 95 | 129 | 16-0/4 |
| 4:10 | 61 | 68 | 95 | 129 | 16-0/4 |
| 4:35–4:40 | 60 | 68 | 88 | 129 | 17-0/4 |
| 5:00 | 58 | 68 | 94 | 129 | 16-0/4 |
| 5:30 | 56 | 68 | 94 | 129 | 16-0/4 |
| 6:00 | 53 | 68 | 95 | 130 | 16-0/4 |
| 7:40 | 50 | 68 | 95+ | 130 | 16-0/4 |
| 8:15 | 49 | 68 | 96 | 130 | 16-0/4 |
| 8:45 | 48 | 68 | 96 | 130 | 16-0/4 |
| 9:15 | 46 | 68 | 96 | 130 | 16-0/4 |
| 9:40 | 45 | 68 | 96 | 129 | 16-0/4 |
| 10:15 | 43 | 68 | 96 | 130 | 16-0/4 |
| 10:45 | 42 | 68 | 96 | 129 | 16-0/4 |
| 11:15 | 41 | 68 | 96 | 129 | 16-0/4 |

[1] Legend for Instrument Readings:
O.T.=Outside Temperature.
W.T.=Water Temperature.
L.P.=Line Pressure (read at meter 50).
I.P.=Injector Pressure (read at meter 36).
F.R.=Flow Rate (read at meter 34).
[2] Discussion of variation on line pressure given in columns 6 and 7, lines 69–77 and 1–10.

In the particular process embodiment of Table 2 a liquid fertilizer, containing nitrogen only (as ammonia) was used. However, the particular composition used may also be any of the neutral liquid fertilizer compositions as shown in U.S. Patent 3,024,100 containing phosphorus and potassium also.

The data of Table 2 was obtained during the application of liquid fertilizer by the apparatus of FIGURES 1 and 2 to 132 acres. The pump 14 then used is a booster pump and is operatively connected to a water source, well 20, by a series of four other engines and pumps; it pumped 1,100 gallons per minute average. Table 4 correlates the numerical flowmeter readings shown in Tables 2 and 3 with volumetric flow rate of the liquid fertilizer solution through meter 34. The liquid fertilizer used was Uran (trade name of the Allied Chemical Company) and consists essentially of a solution of 28% nitrogen (as ammonia); it weighs 10.65 pounds per gallon.

Apparatus 19 is 1,285 feet long from center pivot to outer end. It stayed at each position as end of line 61 in field 67 for 200 hours. Its outer station (56 feet from the outer end of apparatus 19) moved 6 inches every 55 seconds. Thus the coverage was 36,960 gals. per acre. An average of .2816 gallon per minute of solution containing 3.0 pounds of solution was delivered from a source 22 to line 18. Accordingly, there were 50 pounds of nitrogen delivered per acre according to the calculations from the flow rate measurements. On completion of the tests it was determined that we had used 50.68 pounds of nitrogen per acre.

In ordinary operation, water is pumped from a well as 20 to the irrigator 19 for a time dependent on the amount of water needed by the land and the capacity of the well. The fertilizer applied by irrigation according to this invention is applied at a certain rate of pounds of nitrogen, phosphorous or potassium and other trace minerals as de-

TABLE 3.—OPERATION DATA—5 DAY TEST

FIRST DAY

| Time | I.P. | F.R. |
|---|---|---|
| 4:00 p.m. | 140 | 35 |
| 4:30 | 140 | 33 |
| 4:20 | 140 | 34 |
| 4:55 | 140 | 34 |
| 5:20 | 140 | 34 |
| 6:25 | 140 | 34 |
| 8:35 | 140 | 34 |
| 10:20 | 140 | 34 |

SECOND DAY

| | | |
|---|---|---|
| 4:00 a.m. | 140 | 34 |
| 7:00 | 140 | 34 |
| 12:15 p.m. | 140 | 33 |
| 6:30 | 140 | 34 |
| 9:00 | 140 | 34 |

THIRD DAY

| | | |
|---|---|---|
| 7:00 a.m. | 140 | 35 |
| 9:30 | 140 | 34 |
| Reset | | |
| 10:30 a.m. | 142 | 8½ |
| 12:15 p.m. | 142 | 8 |
| Reset | | |
| 12:55 p.m. | 140 | 10 |
| 5:00 | 140 | 9 |
| 5:45 | 140 | 9½ |
| 8:00 | 140 | 9 |

FOURTH DAY

| | | |
|---|---|---|
| 7:00 a.m. | 142 | 9 |
| 7:30 | 140 | 9 |
| 12:15 p.m. | 139 | 9 |
| Reset | | |
| 1:00 p.m. | 120 | 40 |
| 4:30 | 120 | 39 |
| 7:30 | 120 | 40 |

FIFTH DAY

| | | |
|---|---|---|
| 6:00 a.m. | 120 | 40 |

Legend for Instrument Readings:
I.P.=Injector Pressure (read at meter 36).
F.R.=Flow Rate (read at meter 34).

However, the apparatus 10 is not limited for use with fertilizer but also can be used with insecticides and pesticides. Additionally, another object of this invention is to provide an apparatus to deliver reliably a quantitatively controllable supply of liquid insecticied or pesticide to land and crops by an irrigation line and apparatus relatively independent of the normal operational variation in solid content, pressure and volume of flow of water therein. Also, the apparatus 10 is not limited for use with sprinkler irrigation systems, either traveling or stationary, but also can be used in flood type irrigation. Such operations according to this invention are set out in Table 5 and as herebelow described in Example I and Example II.

TABLE 5.—APPLICATION CHART

| Flow Meter Setting | Pounds per Hour of— | | |
|---|---|---|---|
| | 28% Uran Solution | 32% Uran Solution | 11-37-0* (per 100 lbs. of solution) |
| 10 | 62.0 | 56.0 | |
| 11 | 68.4 | 63.6 | |
| 12 | 74.8 | 71.2 | |
| 13 | 81.2 | 78.8 | |
| 14 | 87.6 | 86.4 | |
| 15 | 94.0 | 94.0 | |
| 16 | 100.4 | 101.6 | |
| 17 | 106.8 | 109.2 | |
| 18 | 113.2 | 116.8 | |
| 19 | 119.6 | 124.4 | |
| 20 | 126.0 | 132.0 | 60.0 |
| 21 | 132.2 | 137.6 | 67.2 |
| 22 | 138.4 | 143.2 | 74.4 |
| 23 | 144.6 | 148.8 | 81.6 |
| 24 | 150.8 | 154.4 | 88.8 |
| 25 | 157.0 | 160.0 | 96.0 |
| 26 | 163.2 | 165.6 | 100.8 |
| 27 | 169.4 | 171.2 | 105.6 |
| 28 | 175.6 | 176.8 | 110.4 |
| 29 | 181.8 | 182.4 | 115.2 |
| 30 | 188.0 | 188.0 | 120.0 |
| 31 | 193.7 | 194.8 | 125.6 |
| 32 | 199.4 | 201.6 | 131.2 |
| 33 | 205.1 | 208.4 | 136.8 |
| 34 | 210.8 | 215.2 | 142.4 |
| 35 | 216.5 | 222.0 | 148.0 |
| 36 | 222.2 | 228.8 | 154.4 |
| 37 | 227.9 | 235.6 | 160.8 |
| 38 | 233.6 | 242.4 | 167.2 |
| 39 | 239.3 | 249.2 | 173.6 |
| 40 | 245.0 | 256.0 | 180.0 |
| 41 | 251.5 | 261.2 | 185.2 |
| 42 | 258.0 | 266.4 | 190.4 |
| 43 | 264.5 | 271.6 | 195.6 |
| 44 | 271.0 | 276.8 | 200.8 |
| 45 | 277.5 | 282.0 | 206.0 |
| 46 | 284.0 | 287.2 | 211.2 |
| 47 | 290.5 | 292.4 | 216.4 |
| 48 | 297.0 | 297.6 | 221.6 |
| 49 | 303.5 | 302.8 | 226.8 |
| 50 | 310.0 | 308.0 | 232.0 |
| 51 | 316.2 | 314.4 | 237.6 |
| 52 | 322.4 | 320.8 | 243.2 |
| 53 | 328.6 | 327.2 | 248.8 |
| 54 | 334.8 | 333.6 | 254.4 |
| 55 | 341.0 | 340.0 | 260.0 |
| 56 | 347.2 | 346.4 | 265.6 |
| 57 | 353.4 | 352.8 | 271.2 |
| 58 | 359.6 | 359.2 | 276.8 |
| 59 | 365.8 | 365.6 | 282.4 |
| 60 | 372.0 | 372.0 | 288.0 |
| 61 | 378.0 | 378.8 | 292.8 |
| 62 | 384.0 | 385.6 | 297.6 |
| 63 | 390.0 | 392.4 | 302.4 |
| 64 | 396.0 | 399.2 | 307.2 |
| 65 | 402.0 | 406.0 | 312.0 |
| 66 | 408.0 | 412.8 | 316.8 |
| 67 | 414.0 | 419.6 | 321.6 |
| 68 | 420.0 | 426.4 | 326.4 |
| 69 | 426.0 | 433.2 | 331.2 |
| 70 | 432.0 | 440.0 | 336.0 |
| 71 | 437.6 | 445.6 | 341.2 |
| 72 | 443.2 | 451.2 | 346.4 |
| 73 | 448.8 | 456.8 | 351.6 |
| 74 | 454.4 | 462.4 | 356.8 |
| 75 | 460.0 | 468.0 | 362.0 |
| 76 | 465.6 | 473.6 | 367.2 |
| 77 | 471.2 | 479.2 | 373.4 |
| 78 | 476.8 | 484.8 | 377.6 |
| 79 | 482.4 | 490.4 | 382.8 |
| 80 | 488.0 | 496.0 | 388.0 |
| 81 | 494.8 | 502.4 | 393.2 |
| 82 | 501.6 | 508.8 | 398.4 |
| 83 | 508.4 | 515.2 | 403.6 |
| 84 | 515.2 | 521.6 | 408.8 |
| 85 | 522.0 | 528.0 | 414.0 |
| 86 | 528.8 | 534.4 | 419.2 |
| 87 | 535.6 | 540.8 | 424.4 |
| 88 | 542.4 | 547.2 | 429.6 |
| 89 | 549.2 | 553.6 | 434.8 |
| 90 | 556.0 | 560.0 | 440.0 |
| 91 | 561.6 | 566.0 | 444.8 |
| 92 | 567.2 | 572.0 | 449.6 |
| 93 | 572.8 | 578.0 | 454.4 |
| 94 | 578.4 | 584.0 | 459.2 |
| 95 | 584.0 | 590.0 | 464.0 |
| 96 | 589.6 | 596.0 | 468.8 |
| 97 | 595.2 | 602.0 | 473.6 |
| 98 | 600.8 | 608.0 | 478.4 |
| 99 | 606.4 | 614.0 | 483.2 |
| 100 | 612.0 | 620.0 | 488.0 |

* 11% N, 37% P₂O₅, 0% K₂O.

EXAMPLE I

To determine flowmeter percent setting to use, refer to the formula below for phosphate addition:

A. Divide .37 into amount of actual phosphate desired per acre.

.37 | Desired phosphate per acre

Answer is pounds to be applied per acre.

B. Multiply answer by acres being watered per hour. Take this answer and refer to nearest pounds per hour on Table 5 and set machine to "Flowmeter Setting" on that line.

Calculation (1) If operator wishes to apply 50 lbs. of actual phosphate per acre.

(2) Operator waters ¾ acre per hour.

$$.37 \overline{| \; 50.}^{135.1}$$

135.1 lbs.
× .75 acres watered per hour
─────
101.3

Refer to Table 5 to next largest pounds per hour which is 105.6 and set your flowmeter on "Flowmeter Setting" which is 27.

EXAMPLE II

To determine flowmeter percent setting to use, refer to the formula below for nitrogen addition:

A. Divide .28 into amount of actual nitrogen desired per acre.

.28 | Desired nitrogen per acre

Answer is pounds to be applied per acre.

B. Multiply answer by acres being watered per hour. Take this answer and refer to nearest pounds per hour on Table 6 and set apparatus 10 to "Flowmeter Setting" on that line.

Calculation (1) If operator wishes to apply 50 lbs. of actual nitrogen per acre.

(2) Operator is watering ¾ acre per hour.

$$.28 \overline{| \; 50.}^{178.6}$$

178.6 lbs.
× .75 acres watered per hour
─────
133.9 lbs. to be applied per hour

Refer to Table 5 to next largest pounds per hour which is 138.4 and adjust valve 38 to set flowmeter 29 on "Flowmeter Setting" which is 22.

In another embodiment of this invention the throttle control valve 38 is a metering ball valve and is followed by an orifice plate when using high viscosity liquids. The ball valve is kept wide open and the orifice plate held in an orifice plate holder 117 wherein is located an orifice plate 116. The orifice holes are cylindrical and coaxial with the lines in which used. Test data on the diameter and flow through each such orifice plate (standing alone) are as set out in Table 6. The orifice plates are made of stainless steel and all edges thereof are square.

TABLE 6

| (1) Orifice Plate Diameter of Orifice (inches) | (2) Thickness of Plate (inches) | (3) Pounds Pressure across Plate | (4) Water (Gallons per Hour) Flow Through Orifice |
|---|---|---|---|
| .014 | .0125 | 40 | 1.50 |
| .024 | .0125 | 40 | 4.44 |
| .037 | .0250 | 40 | 9.60 |
| .063 | .0250 | 40 | 30.00 |
| .089 | .0250 | 40 | 60.00 |
| .120 | .0250 | 40 | 108.00 |

Approximate conversion factors for column 4 of Table 6 are:

| Weight of Solution | Specific Gravity | Conversion Factors |
|---|---|---|
| 7.0 lbs. per gallon | .84 | 1.09 |
| 8.0 lbs. per gallon | .96 | 1.02 |
| 8.34 lbs. per gallon | 1.00 | 1.00 |
| 9.0 lbs. per gallon | 1.08 | .96 |
| 10.0 lbs. per gallon | 1.20 | .91 |
| 11.0 lbs. per gallon | 1.32 | .87 |
| 12.0 lbs. per gallon | 1.44 | .83 |

Although, in accordance with the provision of the patent statutes, particularly preferred embodiments of this invention have been described and the principles of the invention have been described in the best mode in which it is now contemplated applying such principles, it will be understood that the operations, constructions and compositions shown and described are merely illustrative and that our invention is not limited thereto and, accordingly, alterations and modifications which readily suggest themselves to persons skilled in the art without departing from the true spirit of the disclosure hereinabove are intended to be included in the scope of the annexed claims.

We claim:

1. A process for treating land with liquid fertilizer which comprises the steps of
   (a) Pressurizing the liquid fertilizer and bringing it to a first, high, pressure level,
   (b) Passing the pressurized liquid fertilizer through an adjustable orifice at a predetermined rate and thereby lowering the pressure of said liquid to a second, lower, pressure level,
   (c) Concurrently raising water from below the ground at a first site and raising its pressure to a water pressure within a range having a maxium lower than the value of said second pressure level, said water pressure of said water within said range being a varying pressure,
   (d) Passing the liquid fertilizer at such second, lower, level of pressure into said stream of water at said range of pressure, and mixing the liquid fertilizer and the water, and
   (e) Passing the admixture to a liquid distributor located on said land at a distance from said first site and distributing said liquid fertilizer on said land.

2. Process as in claim 1 wherein the pressure of said liquid fertilizer is lowered at least 20 pounds per square inch from said first to said second pressure level.

3. Process as in claim 2 wherein the range of variation of said water pressure is about 2 pounds per square inch.

4. Process as in claim 2 comprising the added steps of shutting the flow to the distributor and raising the pressure in said stream of water automatically stopping the flow of said liquid fertilizer into said stream of water, moving said distributor to another area of land, locating said distributor on said land and connecting said distributor to a source of water, passing pressurized liquid fretilizer through the said adjustable orifice at a predetermined constant rate and lowering the pressure of said liquid fertilizer to said second lower pressure level, again passing the liquid at said lower pressure to said stream of water at said range of lower pressure and mixing the liquid fertilizer with said stream and passing the resultant mixture of said liquid fertilizer and said stream to said distributor and to said second area of land.

References Cited

UNITED STATES PATENTS

| 2,756,544 | 7/1956 | Rosgen | 239—179 X |
| 2,757,047 | 7/1956 | Friedmann | 239—310 X |
| 2,858,648 | 11/1958 | Funk | 239—10 X |

M. HENSON WOOD, JR., *Primary Examiner.*

ROBERT B. REEVES, *Examiner.*

H. NATTER, *Assistant Examiner.*